(12) United States Patent
Brandwine et al.

(10) Patent No.: US 10,078,754 B1
(45) Date of Patent: Sep. 18, 2018

(54) VOLUME CRYPTOGRAPHIC KEY MANAGEMENT

(71) Applicant: Amazon Technologies, Inc., Reno, NV (US)

(72) Inventors: Eric Jason Brandwine, Haymarket, VA (US); Gregory Branchek Roth, Seattle, WA (US); Jamie Hunter, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 824 days.

(21) Appl. No.: 14/035,735

(22) Filed: Sep. 24, 2013

(51) Int. Cl.
G06F 21/60 (2013.01)

(52) U.S. Cl.
CPC .................. G06F 21/602 (2013.01)

(58) Field of Classification Search
CPC .... G06F 21/602; G06F 21/575; G06F 21/606; G06F 21/604; G06F 21/34; G06F 21/44; G06F 2009/45587; G06F 11/301; G06F 9/455; G06F 3/066
See application file for complete search history.

(56) References Cited

U.S. PATENT DOCUMENTS

| | | | | |
|---|---|---|---|---|
| 9,009,817 B1 * | 4/2015 | Wieland | ................. | G06F 21/34 713/186 |
| 9,069,703 B2 * | 6/2015 | Raam | .................... | G06F 21/606 |
| 9,189,609 B1 * | 11/2015 | Antony | .................... | G06F 21/62 |
| 2007/0286420 A1 * | 12/2007 | MacLean | ............... | H04N 7/162 380/201 |
| 2009/0092252 A1 * | 4/2009 | Noll | ........................ | H04L 9/083 380/277 |
| 2009/0150631 A1 * | 6/2009 | Wilsey | ................ | G06F 12/1408 711/163 |
| 2010/0005290 A1 * | 1/2010 | Urien | .................... | H04L 9/3263 713/155 |
| 2011/0145820 A1 * | 6/2011 | Pratt | ........................ | G06F 21/83 718/1 |
| 2012/0297206 A1 * | 11/2012 | Nord | ...................... | G06F 21/602 713/193 |
| 2013/0159021 A1 * | 6/2013 | Felsher | ................. | G06F 19/322 705/3 |
| 2013/0198522 A1 * | 8/2013 | Kohno | .................... | G06F 21/62 713/182 |
| 2013/0232329 A1 * | 9/2013 | Marinelli | ................ | G06F 21/80 713/2 |

(Continued)

Primary Examiner — Saleh Najjar
Assistant Examiner — Louis C Teng
(74) Attorney, Agent, or Firm — Davis Wright Tremaine LLP

(57) ABSTRACT

Techniques for providing cryptographic keys for encrypted system volumes on machine instances in virtualized and/or distributed systems are described herein. At a time after detecting the requirement for a cryptographic key by a virtual machine instance, one or more computer system entities within a computer system invoke one or more computer system capabilities at least to create one or more virtual hardware devices capable of representing or providing appropriate cryptographic keys. The virtual hardware devices are connected to the machine instance under the control of the computer system so that the encrypted system volumes may be used. After the cryptographic key is no longer needed, it is detached from the machine instance.

26 Claims, 10 Drawing Sheets

(56) References Cited

U.S. PATENT DOCUMENTS

| | | | |
|---|---|---|---|
| 2014/0040639 A1* | 2/2014 | Raam | G06F 21/606 713/193 |
| 2014/0040886 A1* | 2/2014 | Coles | G06F 9/4401 718/1 |
| 2014/0298449 A1* | 10/2014 | Low | G06F 3/01 726/19 |
| 2014/0337528 A1* | 11/2014 | Barton | H04L 41/00 709/225 |
| 2015/0012831 A1* | 1/2015 | Boggess | G06F 3/1454 715/733 |
| 2015/0244710 A1* | 8/2015 | Koster | G06F 21/44 713/171 |
| 2015/0248356 A1* | 9/2015 | Li | G06F 21/64 713/193 |
| 2015/0293858 A1* | 10/2015 | Raam | G06F 21/606 713/193 |
| 2016/0048461 A1* | 2/2016 | Marinelli | G06F 21/80 713/193 |
| 2017/0083356 A1* | 3/2017 | Jiang | G06F 9/45558 |
| 2017/0242719 A1* | 8/2017 | Tsirkin | G06F 9/45558 |
| 2018/0004954 A1* | 1/2018 | Liguori | G06F 21/575 |

* cited by examiner

US 10,078,754 B1

VOLUME CRYPTOGRAPHIC KEY MANAGEMENT

BACKGROUND

Modern computing systems place a high importance on system security. Computing systems may contain secret or proprietary data, systems, documents, algorithms, drawings and/or designs. If this information becomes available because it is not properly secured and protected, harm to the owners of that data may result. Physical systems such as laptop computers, servers, mobile devices and the like may protect computing information by the use of passwords or may provide greater security by encrypting storage devices and only allowing access if an appropriate cryptographic key is provided at system startup. Such encryption and decryption functionality may be provided at an operating system level in order to further increase security. In computer systems involving virtualized computing environments, where a plurality of guest computing systems may operate on a single host computing system, the guest computing systems may have at least as strong a need for encrypted storage devices. In such virtual computing environments, where the guest computing systems may start and stop automatically, automatically providing encryption and decryption services to virtual machine operating systems without altering the operating systems and without compromising the security of the cryptographic keys are things that many conventional techniques fail to achieve.

BRIEF DESCRIPTION OF THE DRAWINGS

Various embodiments in accordance with the present disclosure will be described with reference to the drawings, in which.

DETAILED DESCRIPTION

Figure 1:
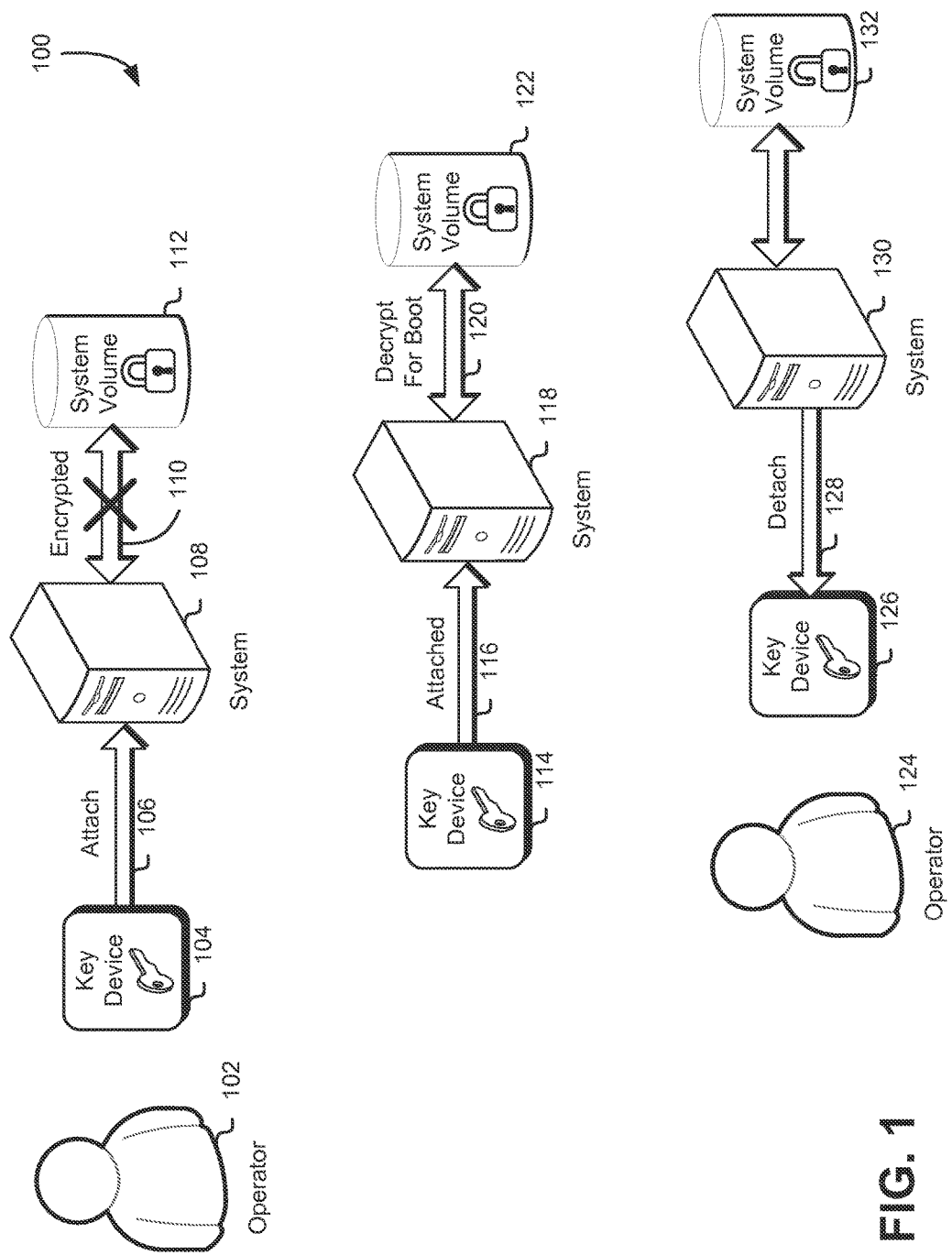
FIG. 1 illustrates an example environment wherein a cryptographic key is provided to a computer system as a physical or virtual hardware device in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for providing encryption and decryption services for system storage devices on systems and executable code operating thereon. In particular, techniques are disclosed for utilizing processor capabilities to facilitate the decryption of system storage devices and for automatically managing such services on guest computing systems or virtual computer systems while these guest or virtual computer systems are operating on one or more host computer systems. A computer system upon which a virtualization scheme is implemented may benefit from securing access to system storage devices including, but not limited to, boot volumes, system volumes, logical volumes, physical volumes, drive arrays and/or other system storage devices by operating systems, guest operating systems, applications, hypervisors and/or other computer system entities. Methods for controlling and/or securing access to system storage devices include, but are not limited to, password protection, drive encryption, file system encryption, firewalls, physical disconnection, physical access control, logical access control and/or other similar techniques.

For example, one method of securing access to systems storage devices is by volume encryption. In a volume encryption system, a boot volume may be unencrypted while a system volume may be encrypted. When a machine or virtual machine with such a system boots, a boot process starts up from the unencrypted boot volume and, if proper credentials are provided, begins decrypting one or more portions of the system volume and booting the system using a volume encryption key. Sensitive data and access to the machine or virtual machine may be accessed only via the encrypted system volume. If the boot process does not receive the proper decryption credentials, the system volume will remain encrypted and the machine or virtual machine will not boot. After successful booting, during normal operation, the system volume may also remain encrypted as it is often computationally expensive to decrypt and re-encrypt a system volume at each boot. Additionally, decrypting the volume at runtime may defeat the purpose of securing it in the first place. Access to the encrypted data at runtime may be transparently provided to applications and operating systems on such a system by a mechanism such as a low-level device driver, by one or more cryptographic processes, by a secure cryptoprocessor and/or by some other such mechanism. In some embodiments, functionality to support encrypted system volumes may be provided by the operating system manufacturer or may be provided by third party hardware, software or firmware or may be provided by a combination of these and/or other service providers.

Access to the encrypted data may only be provided if the proper credentials for decryption are presented at boot time. In some embodiments, credentials may be provided by using a password or a personal identification number ("PIN") at boot time. In such embodiments, before booting, the boot process prompts an operator for the credentials which may be entered via a keyboard and may be based on the prompt. The boot process may allow one or more mistaken entries before locking the system down and preventing further access. The boot process may also securely store the password or PIN in order to facilitate runtime decryption of data by the runtime decryption mechanism or may, in some embodiments, create a secondary or derived key from the entered password or PIN. A stored or copied password, PIN or key may remain hidden from users and user processes by storing it in secured system storage or by incorporating the key into a secure device driver, a kernel module or a secure cryptoprocessor. In some embodiments, credentials may be provided by using an external hardware device including, but not limited to, a universal serial bus (USB) key fob, a biometric processing unit, a smart card or other such security devices. As may be contemplated, these listed security devices should be viewed as illustrative examples only and other security devices and other methods of connecting those security devices are also considered as within the scope of the present disclosure. For example, devices may be connected via USB, IEEE 1394 (also known as FireWire), peripheral component interconnect (PCI), PCI Express (PCIe), DisplayPort or combinations of these and/or other such connection protocols.

In such embodiments where credentials are provided by using an external hardware device, before booting, the user or operator may attach the external device to the system, and the credentials may be provided by the external device. Without the external device, the system may not boot and, as should be contemplated, the data may remain encrypted. As mentioned herein, the boot process may also securely store the password or key in order to facilitate runtime decryption of data by the runtime decryption mechanism or may, in some embodiments, create a secondary or derived key and may store that key. As mentioned above, in some embodiments, credentials may be provided by a mechanism such as a secure cryptoprocessor which is a dedicated piece of hardware that may provide encryption and/or decryption operations or cryptographic keys. Examples of such secure cryptoprocessors include smartcards, trusted platform modules, security chips and/or other such systems. In such embodiments, a secure cryptoprocessor may function by providing a security key, or by directly performing encryption and/or decryption processes or by a combination of these functions. In such embodiments where the secure cryptoprocessor may provide a security key, the boot process may also securely store the password or key in order to facilitate runtime encryption and/or decryption of data by one or more runtime decryption mechanisms or may, in some embodiments, create a secondary or derived key and may store that key. In such embodiments where the secure cryptoprocessor performs the encryption and/or decryption processes, it may not be necessary for the boot process to store the cryptographic key.

In some embodiments, system volume security, encryption and/or decryption may be facilitated by implementing a combination of one or more of the methods mentioned herein and/or other such similar methods. For example, in some embodiments, a user may be required to provide both a key fob and a password or PIN before a system may be booted. In some embodiments, the key fob and/or password or PIN may be used to enable the secure cryptoprocessor which may then perform the boot time and runtime encryption and/or decryption. Thus, it should be noted that other combinations and types of cryptographic methodologies are also considered as within the scope of the present disclosure.

As may be contemplated, it may be difficult, impractical or physically impossible to implement some or all of these methods of providing credentials for system volume encryption and/or decryption on a distributed and/or virtual system using human interaction. In such systems, for example, it may be common for many guest systems to run simultaneously and it also may be common for those guest systems to start and stop frequently. An example of a guest system that may start and stop frequently is a computational server instance which may be instantiated each time a solution is desired, and which may exist only long enough to solve a certain problem and present that solution. Requiring that a human operator available to type in a password or PIN at each boot would be impractical and may lead to a considerable slowdown in data processing. Additionally, an operator or customer may be hundreds or even thousands of miles away from the physical machine running the guest operating systems, making plugging in a USB key fob or a smartcard for each boot similarly impractical, if not impossible.

Techniques disclosed herein include employing one or more hardware virtualization techniques to facilitate encryption and/or decryption of system volumes using automatic computer system processes on a computer system. In some embodiments, wherein a plurality of virtual machines, also known by such names as guest machines, guest virtual machines, guest machine instances, machine instances and virtual computing systems, are running on one or more host computer systems, the techniques described herein may be implemented by one or more processes operating on one or more guest machines, or on the host, or on a controlling domain such as a hypervisor, a virtual machine manager (VMM) or a domain zero (Dom0) on the host, or via processes under control of the controlling domain, or via processes under control of the host operating system or on a combination of these and/or other such computer system entities. In some embodiments, wherein computer systems are running on system hardware in a distributed, data center, local or other such computing system environment, the techniques described herein may be implemented by one or more processes operating on one or more of the computer systems, or on a controlling domain such as a scheduler on a computer system, or via processes under control of the controlling domain, or via processes under control of the host operating system or on a combination of these and/or other such computer system entities. In some embodiments, wherein computer systems may be running on a combination of virtual systems and system hardware, the techniques described herein may be implemented by one or more processes running on a combination of the hosted and/or hardware system entities as described herein.

A key provider service or process may be configured to at least detect the need for a cryptographic key on one or more virtual machine instances and to programmatically provide one or more cryptographic keys to the virtual machine instances. In some embodiments, the key provider service may be implemented by one or more processes including, but not limited to processes managed by a hypervisor, processes managed by the host operating system, processes running in system hardware, processes running on system firmware, processes running on a dedicated coprocessor and/or a combination of these and/or other such processes. In some embodiments, an operating system running on, for example, a virtual machine instance or on system hardware, may be modified in order to provide at least some of the functionality for the key provider service. As may be contemplated, where operating system source code is available such as, for example, in open source operating systems, the operating system source code may be altered to provide at least some of the functionality for the key provider service and an operating system image that may be used to instantiate a guest virtual machine may be built from that modified operating system code. In some embodiments, an operating system running on, for example, a virtual machine instance or on system hardware, may be unmodified from a condition that it was received from an operating system manufacturer and may not provide any of the functionality for the key provider service. As may be contemplated, commercial and other such operating systems where the operating system source is not available to the computer system user and the operating system image is provided to the computer system user by an operating system manufacturer and installed by such methods as from physical media or over a network do not provide any method for the customer altering the source code and in such systems, the functionality for the key provider service comes from external services as described herein.

In some embodiments, the key provider service may detect the need for a cryptographic key by monitoring the guest virtual machine instances. In some embodiments, the key provider service may monitor the guest virtual machine instances for requested access to system hardware at boot time, or the key provider service may monitor the screen output of the virtual machine instance at boot time to determine whether the prompt for the password or PIN is presented to a user by the guest virtual machine or the key provider service may use a combination of these and/or other monitoring techniques. In some embodiments, the key provider service may be alerted to the need for a cryptographic key by guest virtual machine parameters, or by system policy, or by system configuration parameters, or by user supplied configuration parameters or by a combination of these and/or other such factors. In some embodiments, the key provider service may automatically provide a cryptographic key to a virtual machine instance when the virtual machine is instantiated because of known and/or predicted system configuration parameters. In some embodiments, the key provider service may be made available to all guest virtual machines of a certain type, or in a certain classification, or according to customer requests or according to combinations of these and/or other such considerations. As may be contemplated, various combinations of these and/or other techniques may be used to determine whether a key provider service is needed to provide a key. For example, a customer may choose to deploy a plurality of instances of a certain type or classification of guest virtual machine. Some or all of the machines of this type or classification may optionally have an encrypted system volume according to customer choice. In an example such as this, the key provider service may examine all machines of this type of classification at boot time and, if the customer has so opted and if the guest virtual machines do in fact implicitly request a cryptographic key by looking for certain hardware at boot time, then the key provider service may automatically provide virtual access to that hardware and thus to that key.

Once a key provider service has determined that a guest virtual machine needs a cryptographic key, the key provider service may provide that key according to the delivery method requested by the guest virtual machine by instantiating appropriate virtual hardware at system boot time. In some embodiments, where the key would normally be provided to the guest virtual machine via a hardware device such as a USB key fob, a PCIe card, or other such storage device, the key provider service may provide the key by, for example, creating a virtual hardware device that may conform in all practical respects to a physical hardware device. In some embodiments, the virtual hardware device may be previously created at, for example, system startup. The physical hardware device may have an operating system, executable programs, encrypted data, storage and/or a combination of these and/or other system elements. In some embodiments, a virtual hardware device may be created by a key provider service that contains elements that conform to those in the physical hardware device and the virtual hardware device may be virtually attached to the requesting guest virtual machine at boot time. In some embodiments, the virtual hardware device may be created according to a defined template and altered prior to attachment to conform to a particular guest virtual machine. In some embodiments, the virtual hardware device may be a virtual network device that is configured to provide a secure network interface to a key provided from a remote location such as a key provider service located at the customer or some other premises. In such embodiments, the virtual hardware device may be indistinguishable from a physical hardware device from the perspective of the guest virtual machine. As may be contemplated, the creation of this virtual hardware device may be instantiated and attached to a guest virtual machine automatically and under the control of the key provider service, thereby eliminating the requirement for an operator to attach a physical hardware device. In some embodiments, the key provider service may record the creation, attachment and later detachment of the virtual hardware device, thereby providing a record of and/or allowing for auditing of all keys. As may be contemplated, a common problem with physical hardware devices such as USB key fobs is that they are easily lost, improperly shared and may be misused by system operators. A key provider service that logs all key events may help to reduce this misuse, thereby increasing system security.

In some embodiments, where the key would normally be provided to the guest virtual machine via an operator entered password or PIN, the key provider service may provide the key by scanning the output of a virtual screen, looking for a system prompt requesting the key and then providing the key by creating a virtual input device such as a virtual keyboard device and using the virtual keyboard device to virtually type the requested key into the guest virtual machine, thus mimicking human keyboard entry in a virtual environment. As may be contemplated, a computer screen may be thought of as a rectangular representation of a grid of pixel elements that may form recognizable patterns such as letters, numbers and pictures. A virtual computer screen, which may exist in a virtual computer system, is simply the grid of data without the hardware necessary to display it. The elements of a virtual computer screen may be examined in memory by a computer process and text such as, for example, prompts for information may be read by comparing the pixels on the virtual screen to known patterns. Similarly, a keyboard is a device which translates keys and/or combinations of keys to a stream of value patterns each representing a character. A keyboard is generally connected to a computer system via one of several different system busses such as those mentioned herein including, but not limited to, a USB bus. A virtual device representing a virtual keyboard may be created by the key provider service and the appropriate stream of values representing the password or PIN may be sent to the virtual guest machine by virtually typing them in such a way that they may be indistinguishable by the guest virtual machine from the stream provided by a physical keyboard. As may be contemplated, the creation of this virtual keyboard for virtual typing may also be instantiated and attached to a guest virtual machine automatically and under the control of the key provider service, thereby eliminating the requirement for an operator to type in a password or PIN. As mentioned previously, in some embodiments, the key provider service may record the creation, attachment and later detachment of the virtual keyboard and may record all keys sent, once again providing a record of and/or allowing for auditing of all keys.

As may be contemplated, in addition to creating a virtual representation of a hardware device and providing the key by attaching that virtual device to the guest virtual machine, the virtual device may also be emulated by direct communications with the guest virtual machine. For example, a key that may be provided by creating and attaching a virtual USB device with a file system containing the key, may also be provided by direct connection with the file system drivers and/or firmware of the guest virtual machine. By emulating the attachment of the device and communications with the file system without even creating a virtual version of the device, the key may still be provided. Similarly, in embodiments that read a prompt from a virtual screen and respond to a request for a PIN or password with a virtual keyboard, the prompt may instead be read directly from the frame buffer memory of the virtual machine and the response may be sent by sending data directly to the bus where the virtual keyboard might normally be attached.

As may be contemplated, other embodiments for creating and/or attaching virtual hardware for the purposes of providing encryption and/or decryption functionality for encrypted system volumes are also considered as within the scope of the present disclosure. For example, in such embodiments where a key provider service reads a virtual screen and types a password or PIN on a virtual keyboard, the password or PIN may require not only reading the prompt, but also altering the password or PIN based upon unique information contained in the prompt. In such embodiments where a virtual hardware device is created to represent a physical hardware device, the system may require the additional creation of a virtual keyboard to enable encryption and/or decryption from the virtual hardware device by, for example, entering a password or PIN before accessing the virtual hardware device. In some embodiments, the various operations associated with creating the virtual hardware, with attaching the virtual hardware, with detaching the virtual hardware, with creating the keys, with encrypting and/or decrypting the data and with other operations may take advantage of shared and/or hardware restricted virtual and/or physical memory and/or system components on the host or guest machines. Similarly, the various operations described herein may be, in some embodiments, programmable by an application programming interface (API) that specifies how software components such as the components described herein may interact with each other. A cryptographic key API may, for example allow creation, management, destruction, configuration and/or other such operations on the various cryptographic key components and the associated virtual hardware devices. In some embodiments, the entire process may be orchestrated by disparate processes and/or components and may utilize defined or dedicated components such as specific interfaces, management processes or components, specific APIs, system hardware, system software and/or a combination of these and/or other system components on the host and/or guest machines.

FIG. 1 illustrates an example environment 100 for providing a system volume cryptographic key using a hardware device such as, for example, a USB key fob on a computer system in accordance with at least one embodiment. A cryptographic key is a specifically encoded collection of information that, in some embodiments and when combined with one or more cryptographic processes, provides encryption and/or decryption operations on encrypted volumes. In some embodiments, a single cryptographic key may be used for both encryption and decryption. In some embodiments, one key may be used for encryption and a different key may be used for decryption. In some embodiments, different keys may be used for different purposes including, but not limited to, keys for certain portions of a volume, keys for specific types of encryption and/or decryption and/or keys for other such purposes. In some embodiments, keys may be used to further secure keys, providing key wrapper services to ensure the security of the keys themselves. At or near the boot time of a computer system 108 it may be discovered that one or more of the system volumes 112 are encrypted 110. The discovery that one or more system volumes are encrypted may be made by a system boot process, or by an external process running on a different system, or by examining a system configuration or by a combination of these and/or other processes and/or methods. In some embodiments, the system may fail to boot if a cryptographic key is not available prior to commencing the boot process. In some embodiments, the system may wait for a length of time for the cryptographic key to be provided before failing to boot. In some embodiments, the system may wait indefinitely for the cryptographic key to be provided. The choice of whether the system will wait for a cryptographic key to be provided may depend on a number of factors including, but not limited to, system policy, system value, system redundancy, security policy and/or a combination of these and/or other factors.

In response to the need for a cryptographic key, in some embodiments, an operator 102 may attach 106 a key device 104 such as, for example, a USB key fob to the system 108. The system may be, for example, a physical system such as a laptop, desktop, server, mobile device, tablet, router or other such systems and/or devices. The system may also be a virtual system such as a guest virtual machine running on a host machine in a distributed and/or virtual computer system or datacenter or a virtual representation of any of the laptop, desktop, server, mobile device, tablet, router or other such systems and/or devices. The system may also be a distributed combination of physical and virtual systems including, but not limited to, those described herein. In some embodiments, the key device 104 may be a physical device that may be directly attached to the system 108. In some embodiments, the key device 104 may be a physical device that is attached to a system that hosts the system 108 such as is found in a virtual, distributed and/or datacenter environment. In some embodiments, the key device 104 may be a physical device that is attached to a device or system that is connected to the system via one or more networks such as, for example, a local network, an internal network, a public network such as the Internet, a wide-area network, a wireless network, a mobile network, a distributed computing system with a plurality of network nodes and/or the like. In some embodiments, the key device 104 may be a virtual device that is attached to the system 108 via a hardware virtualization scheme such as is found in a virtual, distributed and/or datacenter environment either directly or via one or more network nodes such as, for example, those described herein. In some embodiments, the operator 102 may be a person or may be a combination of one or more computer devices and/or processes configured to at least provide a system 108 access to a key device 104 according to system need.

Regardless of what device that is attached, how it is attached or by who, once the key device 114 is attached 116 to the system 118, the system 118 may begin booting by at least decrypting 120 at least as much of the one or more system volumes 122 as are required by a boot process. In some embodiments, the whole of the system volume may remain encrypted during and after the boot process to prevent access to the encrypted data by other processes and/or systems. In some embodiments, at least a portion of the system volume 122 may be copied to the system 118 and it may be decrypted there. In some embodiments, the system volume data may be decrypted by a process on the system configured to at least decrypt the data. In some embodiments, the system volume data may be decrypted by dedicated hardware and/or software such as, but not limited to, decryption processors or processes located either on the system 118, on other computer system entities or on a combination of the system 118 and other system entities. In some embodiments the system or a process running on the system may copy the key from the key device to the system in order to, for example, create a system device driver configured to at least provide decrypted data to the boot process and to other system and/or user processes during and after booting. Once the key device is no longer needed, either after booting is complete or after a copy of the key has been made, the operator 124 may detach 128 the key device 126 from the system 130. The system volume 132, while still encrypted, may be usable by the system 130 because of the presence of a decryption process which may, for example, incorporate the cryptographic key into a dedicated process or device driver. In some embodiments, one or more computer system entities or processes may provide encryption and/or decryption services as part of the cryptographic methods used for reading and writing to and from the encrypted system volume. In some embodiments, the system may require that the key device be detached before booting is complete in order that the key not be visible to user processes. In some embodiments, the system may require that the key device be detached before the system enters a mode accessible to users also in order to ensure that the key not be visible to users. The choice of when the key device is to be removed may depend on a variety of factors such as system policies, system configurations, security policy and/or other such factors.

Figure 2:
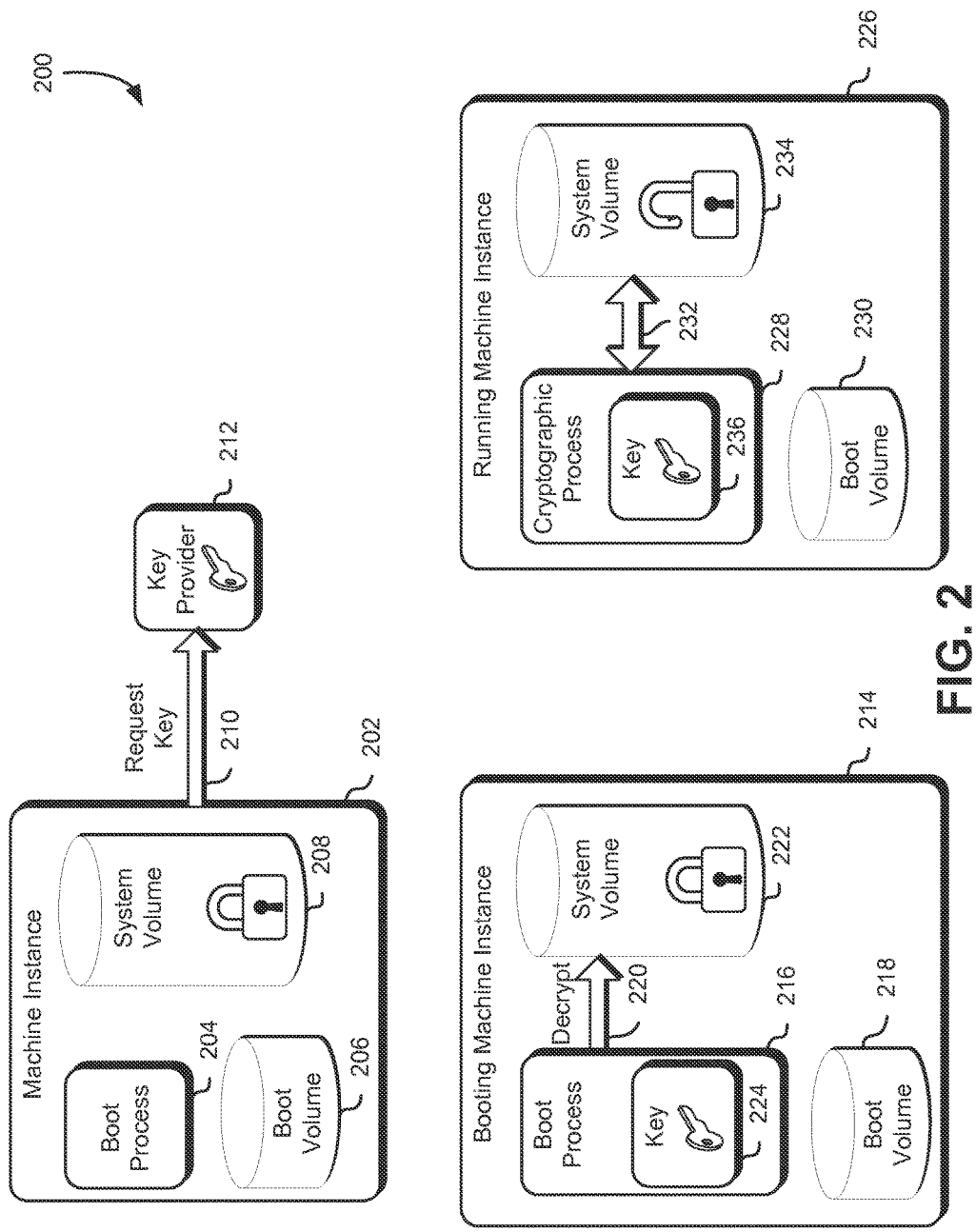
FIG. 2 illustrates an example environment wherein a computer system with one or more encrypted system volumes is booted in accordance with at least one embodiment.

FIG. 2 illustrates an example environment 200 for booting a machine instance with one or more encrypted system volumes in accordance with at least one embodiment. A machine instance 202 may contain an unencrypted boot volume 206 and one or more encrypted system volumes 208. In some embodiments, the boot volume 206 may contain at least enough data and information to begin a boot process 204. The boot process may request a cryptographic key 210 from a key provider 212 or may direct another process to request the cryptographic key. The process that requests a key may do so by searching for a certain piece of hardware such as, for example, a USB key fob, or a smart card or some other such hardware and in some embodiments, may locate a key stored on that hardware or use some characteristic or combination of characteristics of that hardware as the key. In some embodiments, the process that requests a key may do so by prompting the user to enter a key, a passcode, a PIN or a combination of these and/or other such identifying strings. In such embodiments, the process may provide information to identify the required key such as a system ID or some other such value. The provided information in the prompt may include such information as globally or locally unique strings, system identifying features, password or PIN hints and/or other such information as may facilitate the key entry. In such embodiments where the user may enter the required key, the requesting process may allow one or more tries at entering the correct key before locking out the system. In such embodiments where the user may enter the required key, the requesting process may require the entry to be within a certain specified time period.

After having received an acceptable key, the machine instance 202 may transition to a booting state, thus becoming a booting machine instance 214. The key is needed by the boot process 216 and/or by other processes under the control of the boot process to boot the machine. The key may be copied 224 from the key provider to the boot process 216, or to one or more processes under the control of the boot process, or to a location specified by the boot process or to one or more such locations to facilitate access during booting. In some embodiments, the key may not be copied, but may remain on the key provider and may be used from there. In some embodiments, the key may not be copied, but may be created by the boot process or by a process under the control of the boot process from information provided by the key provider. With an accessible key, the boot process and/or other processes under the control of the boot process may begin 220 decrypting those portions of the system volume or volumes 222 that are needed for booting the machine instance. The boot process or other processes may, in some embodiments, use and store information during the boot on both the boot volume 218 and the encrypted system volume or volumes 222.

Upon completion of the booting process, the booting machine instance 214 may transition to a running state, thus becoming a running machine instance 226. In some embodiments, the system volume or volumes 234 may remain encrypted, with decryption of data 232 retrieved from the system volume or volumes and encryption of data 232 stored on the system volume or volumes facilitated by a cryptographic process 228, using a key 236. The cryptographic key and process may, in some embodiments, have been created by the boot process or by some other process during the booting of the machine instance. The cryptographic process may be a device driver, or a system process or some other such process. The unencrypted boot volume 230 is generally not used while the system is running although, in some embodiments, may be used during system shutdown.

Figure 3:
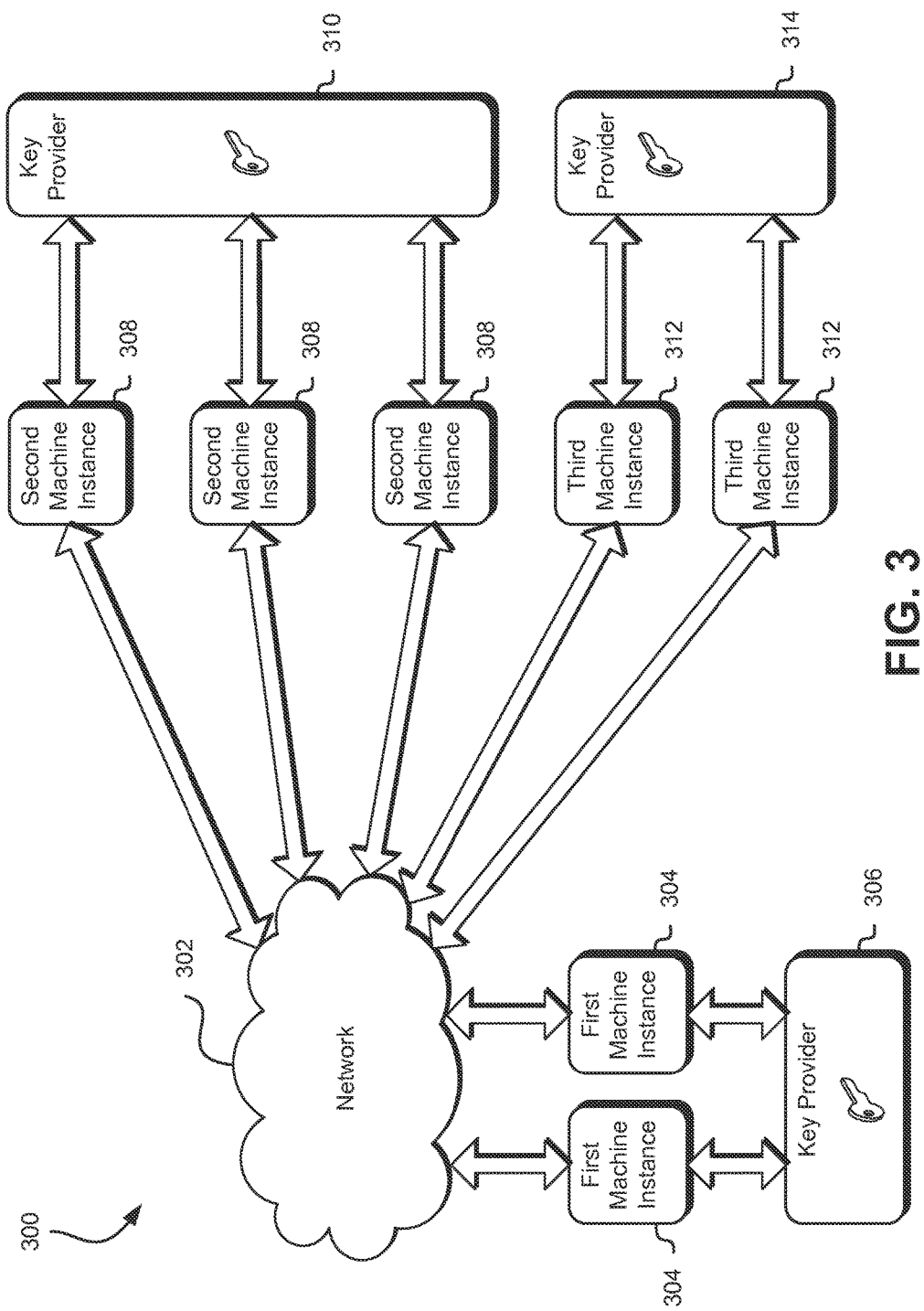
FIG. 3 illustrates an example environment wherein various embodiments may be exercised in a distributed and/or virtual computing environment in accordance with at least one embodiment.

The machine instance 204 from FIG. 2 may be among a plurality of machine instances in a distributed computer system, virtual computer system and/or a datacenter. FIG. 3 illustrates an example distributed computing environment 300 in which various embodiments may be exercised. One or more machine instances may be connected using one or more networks 302 and/or entities associated therewith, such as other systems connected to the network, either directly or indirectly. The network may, for example, be a local network, an internal network, a public network such as the Internet, a wide-area network, a wireless network, a mobile network, a distributed computing system with a plurality of network nodes and/or the like. In some embodiments, those machine instances that are built from the same base image may have the same key provider, so each first machine instance 304 may request a key from key provider 306, each second machine instance 308 may request a key from key provider 310 and each third machine instance 312 may request a key from key provider 314. As described previously, at least in connection with FIG. 1, the key providers may be hardware devices such as USB key fobs or smartcards or may be prompts for a user to enter a key or may be some other such mechanism. As may be contemplated, the different species of machine instances may be instantiated according to desired functionality, capabilities or other such concerns.

Figure 4:
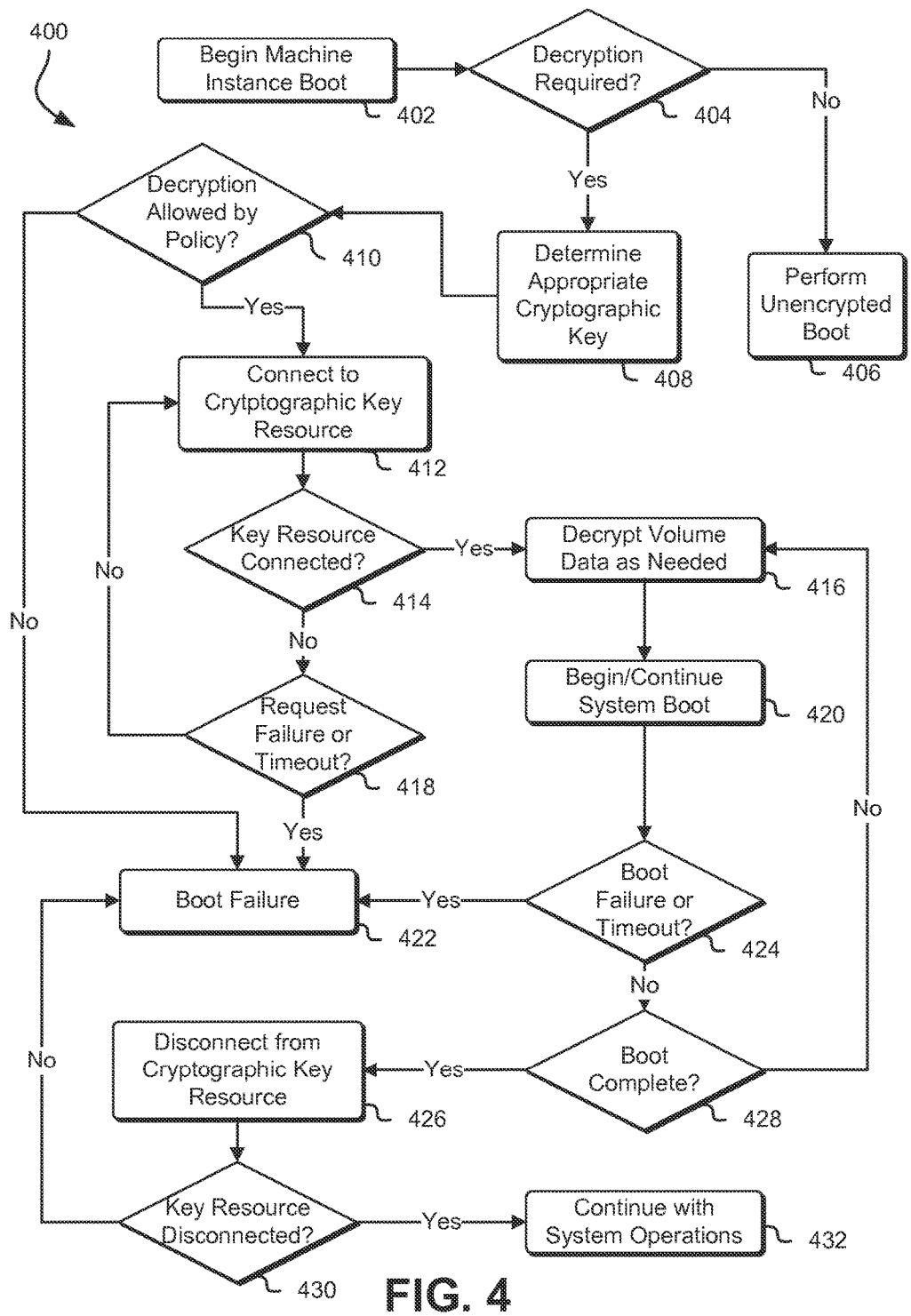
FIG. 4 illustrates an example process for boot time decryption of an encrypted system volume in accordance with at least one embodiment.

FIG. 4 illustrates an example process 400 for boot time decryption of an encrypted system volume as described at least in connection with FIG. 1 and in accordance with at least one embodiment. Process 400 may be performed by a key provider service process such as key provider described at least in connection with FIG. 2. A boot process begins on a machine instance 402. After the boot process begins, the system volumes are examined to determine 404 if decryption is required. In the case where decryption is not required such as, for example, in situations where the one or more system volumes have not yet been encrypted or where the system owner has decided to remove drive encryption security, an unencrypted boot 406 of the system may be performed using the one or more unencrypted system volumes. If it is determined that decryption is required, the appropriate cryptographic key may be 408 determined. In some embodiments, the appropriate cryptographic key may be determined from a set of one or more keys that have been made available to the key provider service by such processes as examining the machine instance volume identifier ("volume ID"), or from a lookup table, or by querying a secondary service, or by a combination of these and/or other such processes.

After the appropriate cryptographic key is 408 determined, in some embodiments, a policy decision 410 may be made to determine whether to allow decryption of this volume. This decision may be made by comparing one or more aspects of the machine instance to one or more key provider and/or security policies to evaluate whether the decryption of the system volume may be allowed. For example, in some embodiments the system volume ID may be compared to a table of entries to see if that volume ID is on an allowed list or on a disallowed list. The machine instance may also be examined and certain aspects of the machine may be measured and compared against known and/or desired values including, but not limited to, CPU register contents and/or state, system memory contents and/or state, the existence of and/or absence of certain system processes, system execution traces, resource demands, customer type, instance type, external system factors or a combination of these and/or other measurements. In some embodiments, the key provider process may combine one or more of these measurements with other values and/or measurements to produce a relative weighting value that may be used at least in part in determining whether decryption of a machine instance system volume may be allowed by policy. As may be contemplated, the key provider service and/or one or more processes associated with or under the control of the key provider service may use a variety of other techniques to determine and enforce policies regarding the providing of encryption keys and such other techniques are also considered as within the scope of the present disclosure.

If it is determined 410 that decryption of the system volume is not allowed by policy, then, in some embodiments, the boot may fail 422. In some embodiments, if it is determined 410 that decryption of the system volume is not allowed by policy and that 422, the boot may fail, then mitigation actions for the boot failure may be taken, including, but not limited to rebooting the instance, stopping the instance, terminating the instance, alerting a system operator, alerting the customer, or a combination of these and/or other mitigation actions. If it is determined 410 that decryption is allowed by policy, an attempt 412 may be made to connect to a cryptographic key resource such as one or more of the cryptographic key resources described at least in connection with FIG. 1. For example, in some embodiments, the boot process may look for a connected virtual hardware device that represents a physical hardware device, or the boot process may prompt a user to enter a key or the boot process may perform a combination of these and/or other such actions to acquire a cryptographic key. If 414 a connection to a key resource is not immediately available, it may next be determined 418 whether the boot process should continue looking for a key resource. The determination of whether the boot process should continue searching for a key resource may be based on a variety of criteria including, but not limited to, the type of key resource, system policy, system type, security policy and/or a combination of these and/or other such criteria. For example, in embodiments where the boot process prompts the user to enter a key, the boot process may only allow a certain number of failed attempts before failure or the boot process may require the key to be entered within a certain amount of time. In some embodiments where the key is provided by an attached hardware device, the boot process may require the hardware device to be attached to the system prior to, or within a certain amount of time after the beginning of the boot process. If the boot process is not able to connect to the key resource and it is determined 418 that the boot process should stop looking, then 422, the boot may fail. If it is determined 418 that the boot process may continue attempting to connect to the key resource, the boot process may return 412 to attempting to connect to the key resource.

If the key resource is obtained, the boot process may begin booting by 416 beginning to decrypt the system volume data as needed for the system boot 420. The system volume data may remain encrypted on the system volume, but may be decrypted in the boot process so that the system boot may proceed without leaving the system vulnerable to other processes and/or systems. Writes of data back to the encrypted system volume may require encryption of the written data under one of more cryptographic processes. If there is a boot error 424, the system may experience boot failure 422. In some embodiments, the system boot may fail due to a failure in encryption and/or decryption or because of some other error in the boot process. In some embodiments, the system boot may fail because of processes taking too long to complete. In the event that the system boot does not fail or timeout, the boot process may continue decrypting system volume data and booting the system until 428 the boot is complete at which point the key resource may be disconnected 426 and normal system operations may commence 432. In some embodiments, the system may not continue with normal system operations 432 and may instead fail the boot 422 if the key resource is not connected 430. This final check may, in some embodiments, prevent the key resource from being made available to user processes or users, thereby increasing security of the key resource.

As may be contemplated, step 410 of process 400 which includes determining whether decryption is allowed by policy, while illustrated here as being performed once at the beginning of the process, may be performed a plurality of times, may be performed later in the process and/or may be performed after the process has completed. For example, the key provider service may continue measuring and evaluating the various states of virtual machine instance throughout the boot process and, in the event that conditions change to make it no longer desirable to provide the key to the virtual machine instance, the key may be removed, thus causing boot failure. Similarly, after the virtual machine has completed booting, and is running normally, the key provider service may also continue measuring and evaluating the various states of the virtual machine instance and again, in the event that conditions change to make it no longer desirable to provide the key to the virtual machine instance, the key may be removed, thus causing the virtual machine to at least lose the ability to read and/or write to the system volume.

Figure 5:
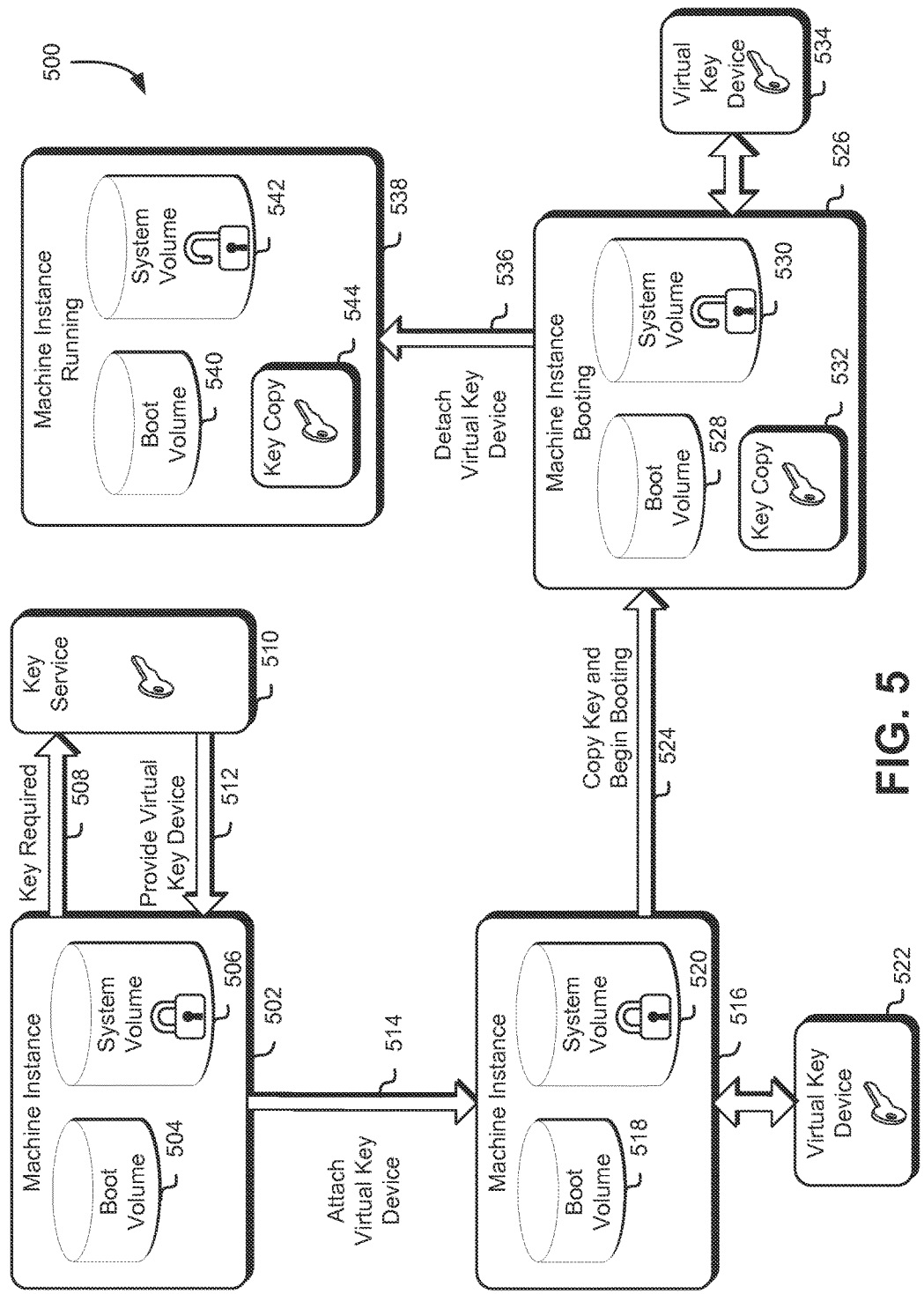
FIG. 5 illustrates an example environment wherein a cryptographic key is provided to a machine instance in accordance with at least one embodiment.

FIG. 5 illustrates an example environment 500 for providing a cryptographic key to a guest virtual machine as described at least in connection with the process illustrated in FIG. 4 and in accordance with at least one embodiment. A machine instance 502 with an unencrypted boot volume 504 and one or more encrypted system volumes 506 may need a cryptographic key in order to boot as described at least in connection with FIGS. 1 and 2. A key service 510 may detect that the machine instance 508 requires a key according to methods described herein and at least in connection with FIG. 1. The key service may create and/or instantiate a virtual key device and 512 provide the virtual key device to the machine instance. In some embodiments, and as described herein, the key device may be a virtual device which conforms to and acts as a virtual USB key fob, or may be a virtual device which conforms to and acts as a virtual smart card, or may be a virtual device which conforms to and acts as a virtual keyboard or may be some other virtual device according to the key and/or system requirements. As may be contemplated, the example illustrated in FIG. 5 operates the same regardless of which type of key device is used in the particular embodiment.

The virtual key device 522 is attached 514 to the machine instance 516 as described at least in connection with FIG. 1 and in accordance with at least one embodiment. One or more boot processes may access an unencrypted boot volume 518 and one or more encrypted system volumes 520 to begin booting as described herein and in accordance with at least one embodiment. In some embodiments, one or more boot processes may 524 copy the key from the virtual key device 522 and begin booting. In some embodiments, the key is not copied from the virtual key device before booting begins. While the machine instance is 526 booting, one or more boot processes may access the unencrypted boot volume 528 and using the key copy 532 and/or the virtual key device 534, may access the one or more encrypted system volumes 530. At the conclusion of booting, the virtual key device 536 may be detached and the machine instance may enter 538 running state. While running, the boot volume 540 is generally not used and a process may use the key copy 544 to access the one or more encrypted system volumes 542 as described herein at least in connection with FIGS. 1 and 2 and in accordance with at least one embodiment.

Figure 6:
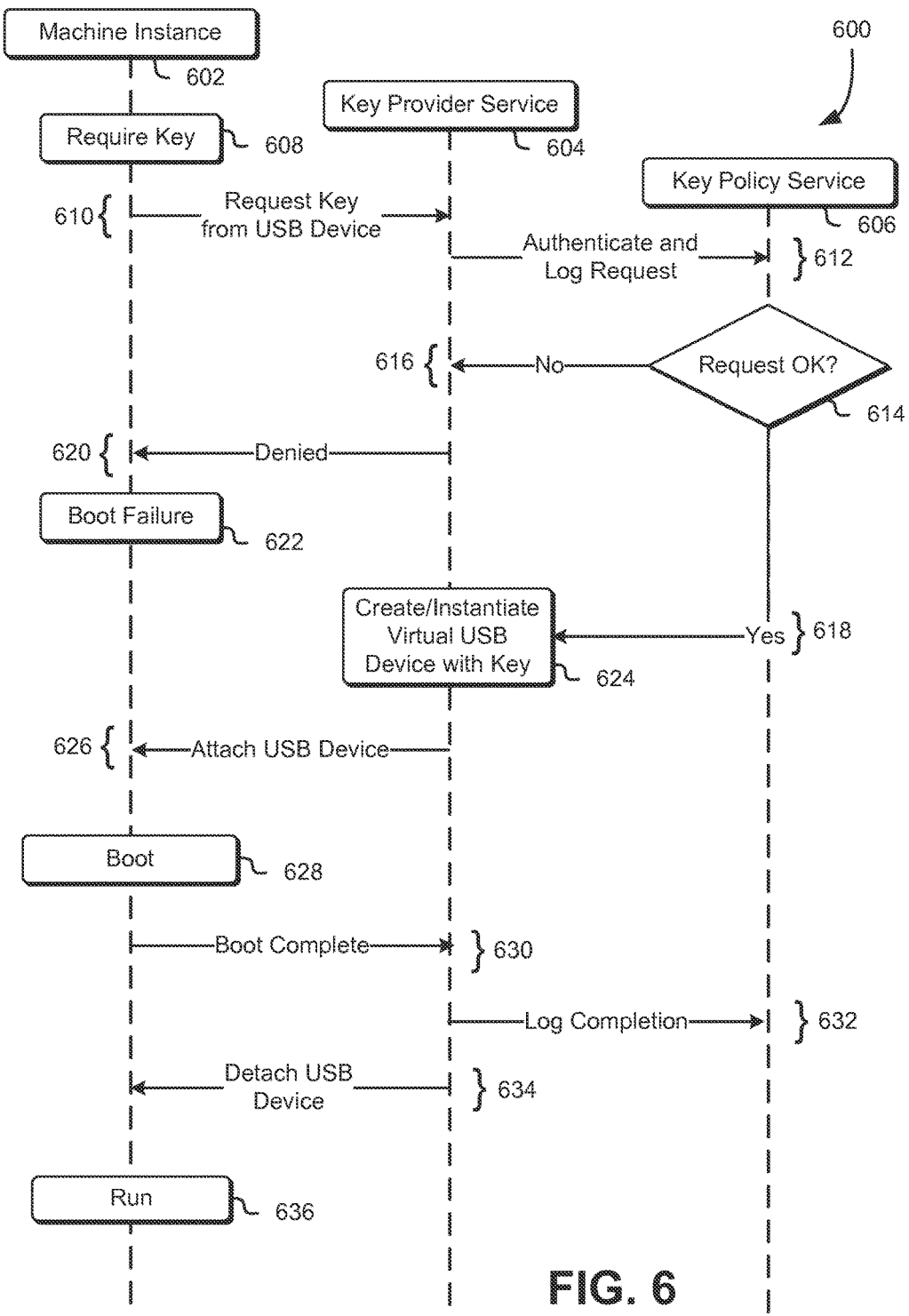
FIG. 6 illustrates an example process and timeline for providing a cryptographic key to a machine instance via the creation of a virtual hardware device in accordance with at least one embodiment.

FIG. 6 illustrates an example process and timeline 600 for providing a cryptographic key to a guest machine instance by creating a virtual hardware device such as a virtual USB device as described at least in connection with FIG. 1 and in accordance with at least one embodiment. Process 600 may be performed by a key provider service process such as key provider described at least in connection with FIG. 2. A machine instance 602 may require a key 608 as described herein at least in connection with FIG. 1. In some embodiments, the machine instance may look for a hardware device and 610 request a key from that hardware device. A key provider service 604 may monitor the machine instance and, in some embodiments, may be configured to at least respond to the search for the hardware device by creating a virtual hardware device to act as the key device. In some embodiments, the virtual hardware device may be created at the time of the request or one or more virtual hardware devices may be created earlier such as, for example, at system startup, and then may be stored by the key provider service to be attached as needed. In some embodiments, the key provider service may contain and/or be connected to 606 a key policy service that monitors, logs, approves and/or otherwise controls access to cryptographic keys. The key provider service may 612 seek authentication of the key request from the key policy service and also log the request in one or more system logs. The request 614 may be authenticated by the key policy service according to one or more factors including, but not limited to, system policy factors, security policy factors, system configuration factors and/or other such factors. In the event 616 that the request is not authenticated, the request may be denied 620. In some embodiments, the key provider service may elect to not authenticate the request because, for example, the requesting machine instance is not authorized to receive a key, or because the requesting machine instance may not boot at this time, or because there are no keys available for a variety of these and/or other such reasons. In some embodiments, the denial of the request may be accomplished by taking no specified action. In such embodiments, the lack of an attached hardware device will cause the machine instance to perform its own failure mitigation processes including, but not limited to boot failure 622, prompts for attaching the hardware device, requests to enter a key from another location and/or a combination of these and/or other such mitigation processes.

As may be contemplated, a key provider service may, in some embodiments, be configured to respond to key failure mitigation processes. For example, as described herein at least in connection with FIGS. 1 and 8, a key provider service may be configured to detect prompts for key entry on a virtual machine and to respond to those prompts appropriately. In the event that a key policy service denies a key request, a key provider service may, in some embodiments, be configured to cancel requests for alternate key locations and/or to cancel requests to manually enter a key. System and security policies may also be configured to cause the key policy service to refuse the authentication for a cryptographic key, but allow searching for the key in an alternate location or allow the manual entry of a key as described herein at least in connection with FIG. 8.

In the event 618 that the request for a cryptographic key is authenticated by the key policy service, the key provider service may 624 create or instantiate a virtual hardware device that at least contains the appropriate key information and may 626 attach that virtual key device to the machine instance and the machine may then 628 boot as described herein at least in connection with FIG. 1 and in accordance with at least one embodiment. When the key provider service determines 630 that the boot is complete, the successful boot may be logged 632, the virtual hardware device may be detached from the virtual machine 634 and the virtual machine may then be ready to run 636. As may be contemplated, boot failures, boot status, boot timing, boot errors and/or other such events may also be logged by the key policy service according to system policy.

Figure 7:
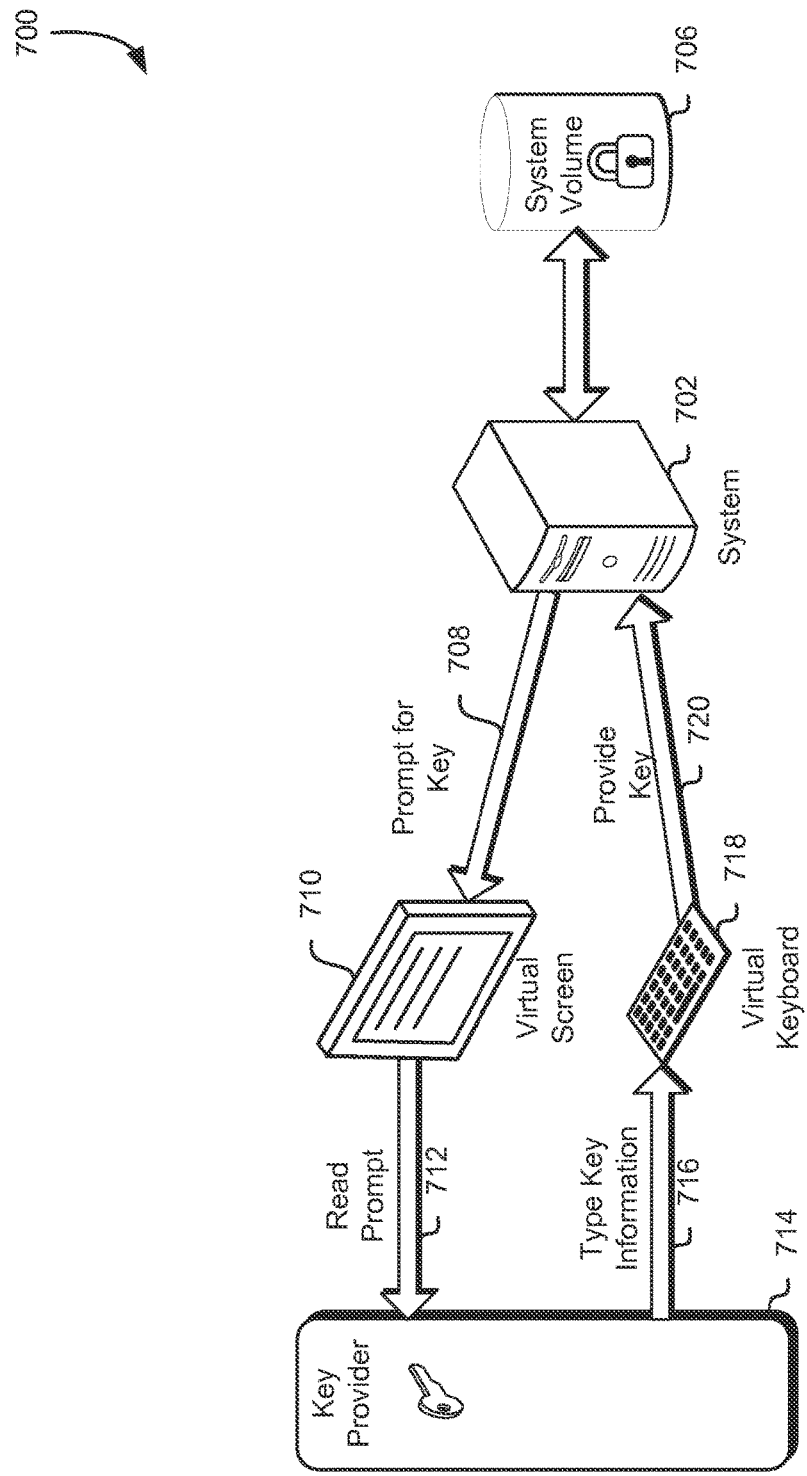
FIG. 7 illustrates an example environment wherein a virtual keyboard and virtual screen are used to provide access to a cryptographic key for a machine instance in accordance with at least one embodiment.

FIG. 7 illustrates an example environment 700 for providing a cryptographic key to a guest machine instance using a virtual screen device and a virtual keyboard device as described at least in connection with FIG. 1 and in accordance with at least one embodiment. A system 702 with one or more encrypted system volumes 706 may, as part of a boot process, prompt for a key 708. In some embodiments, the prompt may be displayed on a virtual screen 710. In some embodiments, the prompt may contain information about the system, about the key, about the time allowed to enter the key and/or about other system information. A key provider service 714 may monitor the virtual screen as described at least in connection with FIG. 1 and, upon detecting the prompt for a key, may 712 read the prompt from the virtual screen. The key provider may then create or instantiate a 718 virtual keyboard and may 716 type the key information into the virtual keyboard, thus 720 providing the key to the system. In some embodiments, the key information may be at least partially based on information contained in the prompt. In some embodiments, there may be one or more iterations of reading the prompt and responding with appropriate information before the key process is complete.

As may be contemplated, the process illustrated in FIG. 7 may be just a portion of a more complex process for providing a cryptographic key. For example, in some embodiments system policy may require that, in addition to typing a key, a password, a PIN or some other such identifying object as described at least in connection with FIG. 7, that a virtual hardware device such as, but not limited to, a virtual USB key fob is also connected to the system such as is described herein at least in connection with FIG. 5. As also may be contemplated, the process illustrated in FIG. 7 may also be used in different ways as part of a process or processes to facilitate providing a cryptographic key. For example, the process of providing a virtual USB key fob may include prompts for a user to press a key when the USB device is attached. The process illustrated in FIG. 7 may be extended to provide that key press in a virtual environment.

Figure 8:
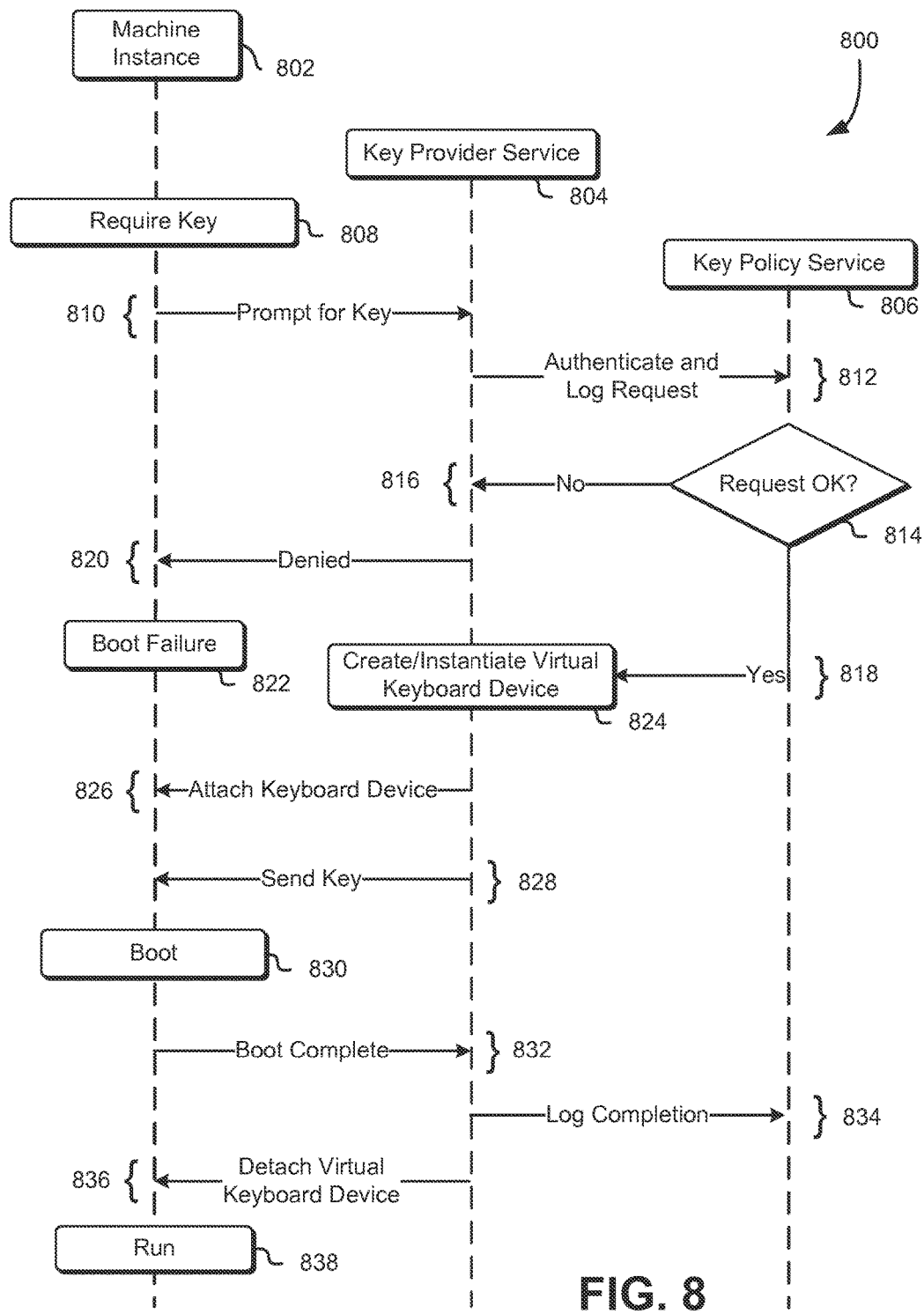
FIG. 8 illustrates an example process and timeline for providing a cryptographic key to a machine instance via the creation of a virtual keyboard in accordance with at least one embodiment.

FIG. 8 illustrates an example process and timeline 800 for providing a cryptographic key service and a virtual key policy system to a guest machine instance via a virtual screen device and a virtual keyboard device as described at least in connection with FIG. 1 and in accordance with at least one embodiment. Process 800 may be performed by a key provider service process such as key provider described at least in connection with FIG. 2. A machine instance 802 may require a key 808 as described herein at least in connection with FIG. 1. In some embodiments, the machine instance may 810 prompt for keyboard entry of a key, password, PIN or other such object. A key provider service 804 may monitor the machine instance and, in some embodiments, may be configured to at least respond to the prompt for a key by reading a virtual screen and by creating a virtual keyboard device to enter the key. In some embodiments, the key provider service may contain and/or be connected to 806 a key policy service that monitors, logs, approves and/or otherwise controls access to cryptographic keys. The key provider service may 812 seek authentication of the key request from the key policy service and also log the request. The request 814 may be authenticated by the key policy service according to one or more factors including, but not limited to, system policy factors, security policy factors, system configuration factors and/or other such factors. In the event 816 that the request is not authenticated, the request may be denied 820. In some embodiments, the denial of the request may be accomplished by taking no specified action and waiting for the machine instance to timeout, or by entering an incorrect key, or by cancelling the request or by a combination of these and/or other such responses. In such embodiments, the lack of an attached cryptographic key will cause the machine instance to 822 perform its own failure mitigation processes including and, as described above at least in connection with FIG. 6, the key provider services may be configured to appropriately respond to such mitigation processes.

In the event 818 that the request for a cryptographic key is authenticated by the key policy service, the key provider service may 824 create or instantiate a virtual keyboard device so that the appropriate key may be entered and may 826 attach that virtual keyboard device to the machine instance. The key provider service may then 828 enter the key by sending appropriate values to the machine instance. In some embodiments, the key entry process may involve reading from a virtual screen on the machine instance and responding to one or more prompts according to the information on the screen. Once the key entry process is complete, the machine may then boot 830 as described herein at least in connection with FIG. 1 and in accordance with at least one embodiment. When the key provider service determines 832 that the boot is complete, the successful boot may be logged 834, the virtual keyboard may be detached from the virtual machine 836 and the virtual machine may then be ready to run 838. As may be contemplated, boot failures, boot status, boot timing, boot errors and/or other such events may also be logged by the key policy service according to system policy.

Figure 9:
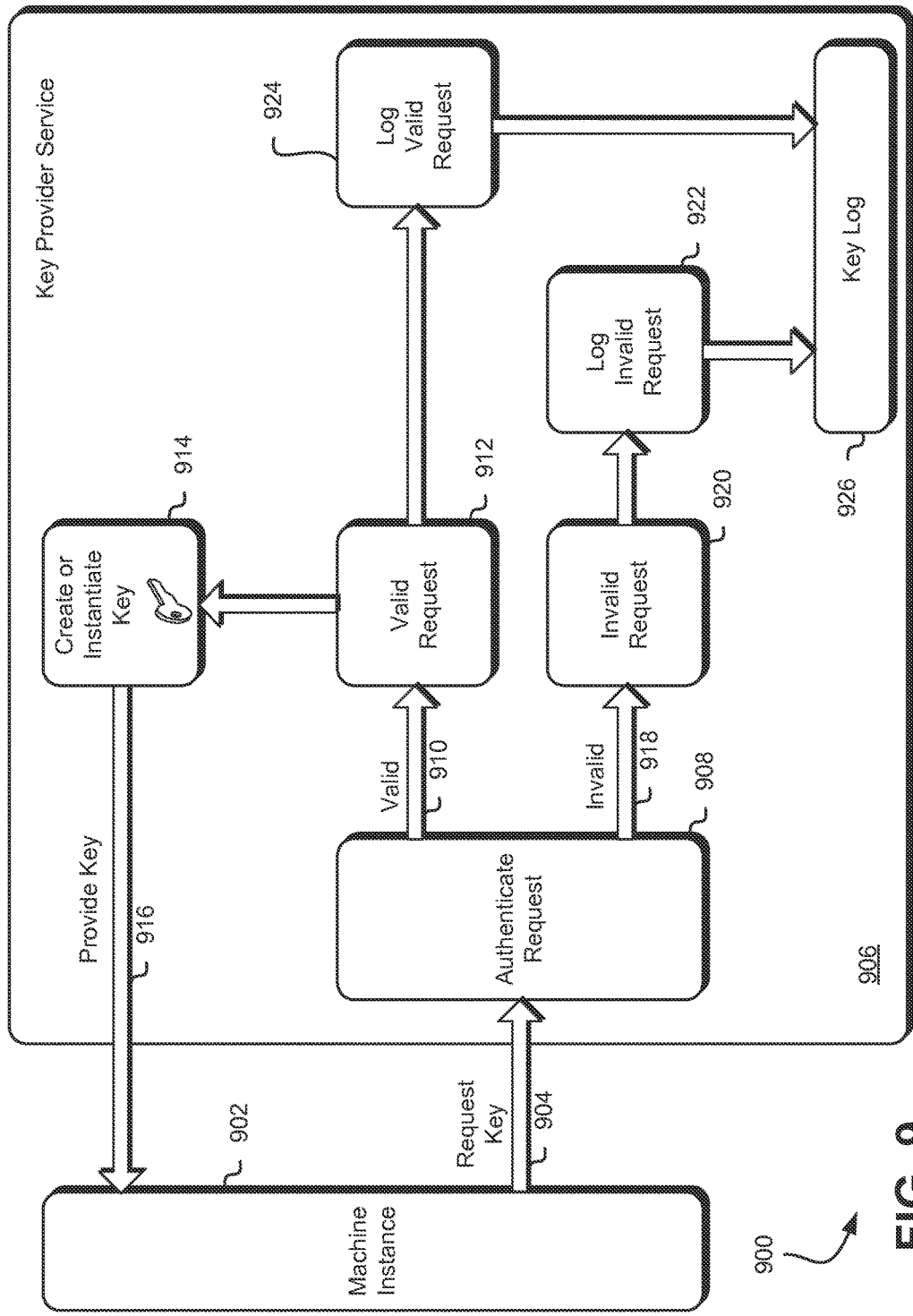
FIG. 9 illustrates an example environment wherein a request for a cryptographic key is processed in accordance with at least one embodiment.

FIG. 9 illustrates an example environment 900 for processing a cryptographic key request from a guest machine instance by a key provider service as described at least in connection with FIG. 1 and in accordance with at least one embodiment. A machine instance 902 may request a key 904 from a key provider service 906. One or more processes associated with and/or under the control of the key provider service may authenticate the request 908. The request may be authenticated for a valid user, a valid machine ID, a valid key request and/or a combination of these and/or other such validation parameters. If 910 the request is valid, the valid request 912 may be logged 924 to a key log 926, a key 914 may be created and/or instantiated and the key provided 916 to the machine instance. As may be contemplated, other information may be logged to the key logger in response to a valid request including, but not limited to, the key provided, the key requester, time of the request and other such information regarding the request. If 918 the request is not valid, 920 the invalid request and other relevant information may be then logged 922 to the key logger 926. The key provider service may then take other actions in response to the invalid request including, but not limited to, instantiating processes to at least process any secondary and/or mitigating actions taken by the machine instance in response to the failure of the key request as described herein at least in connection with FIG. 7 and in accordance with at least one embodiment.

Figure 10:
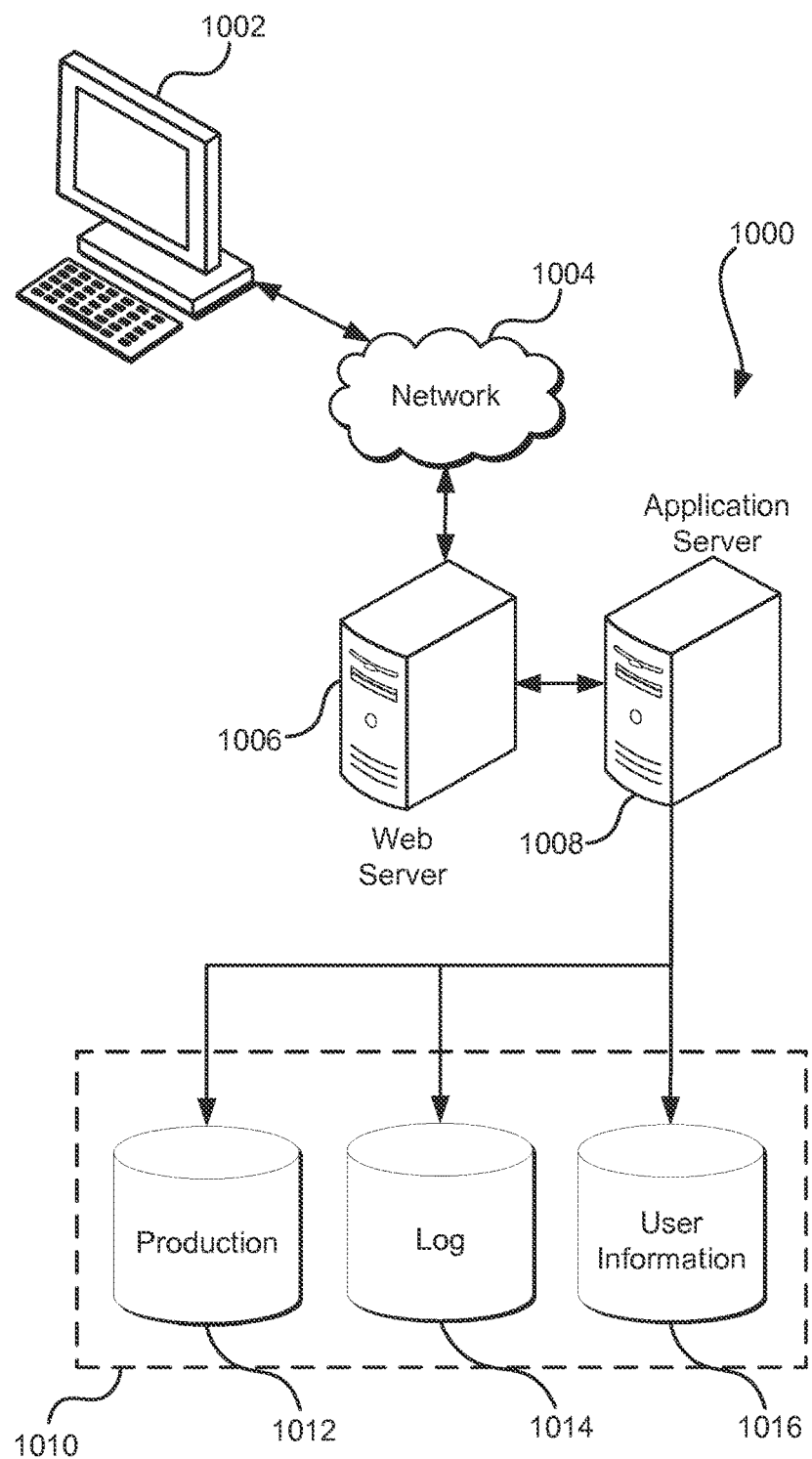
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010.

The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   detecting, at a guest computing system, one or more encrypted volumes attached to the guest computing system;
   requesting a cryptographic key for decryption of the one or more encrypted volumes;
   determining whether the cryptographic key fulfills a requirement for reading the one or more encrypted volumes based at least in part on one or more computer system security policies; and
   as a result of determining the cryptographic key fulfills the requirement for reading the one or more encrypted volumes:
      providing, during a boot process, access to the cryptographic key to the guest computing system;
      monitoring the guest computing system, during the boot process, to detect when access to the cryptographic key has ended; and
      removing, during the boot process, from the guest computing system access to the cryptographic key after detecting that access to the cryptographic key has ended.

2. The computer-implemented method of claim 1, wherein providing access to the cryptographic key to the guest computing system comprises attaching a virtual cryptographic hardware device to the guest computing system that provides the cryptographic key to the guest computing system.

3. The computer-implemented method of claim 1, wherein providing access to the cryptographic key to the guest computing system comprises:
   determining that the guest computing system has sent a prompt for the cryptographic key; and
   sending a response to the prompt for the cryptographic key, the response at least including the cryptographic key, the cryptographic key generated by emulating one or more keystrokes via a virtual input device.

4. The computer-implemented method of claim 1, wherein the method further comprises:
   logging the request for the cryptographic key to a system log; and
   logging the result of the determination whether the cryptographic key fulfills the requirement for reading the one or more encrypted volumes.

5. The computer-implemented method of claim 1, wherein monitoring the guest computing system to detect when access to the cryptographic key has ended at least comprises determining that the guest computing system has at least reached a specified state in the boot process.

6. The computer-implemented method of claim 1, wherein providing access to the cryptographic key to the guest computing system comprises:
   creating a virtual smart card that provides the cryptographic key; and
   enabling the computing system to read the cryptographic key from the virtual smart card.

7. The computer-implemented method of claim 1, further comprising:
   receiving a provisioning request over an application processing interface to provision the guest computing system, the provisioning request including at least:
      an indication of an operating system image, wherein:
         the operating system image supports encrypted volumes via storage of the cryptographic key on a designated hardware device or via entry of the cryptographic key at startup; and
         the operating system image corresponds to an operating system provided by an operating system manufacturer with a capability for supporting encrypted volumes;
      an indication of one or more encrypted volumes under the control of the operating system of the one or more encrypted volumes of the guest computing system; and
      an indication of the cryptographic key; and
   causing the provisioning request to be fulfilled.

8. A computer system, comprising:
   one or more hardware processors; and
   memory having executable instructions stored thereon that, as a result of being executed by the one or more processors, cause the computer system to:
      provide an execution environment for a guest operating system; and provide a management component that controls operation of the provided execution environment that at least:
determines, during a boot process, that a cryptographic key not available to the guest operating system is required to read one or more encrypted volumes associated with the guest operating system for continued execution of the guest operating system; and
causes a change to a configuration of the execution environment to make the cryptographic key accessible to the guest operating system during the boot process in a manner that prevents the guest computing system from accessing the cryptographic key after the boot process.

9. The computer system of claim 8, wherein prior to the management component changing the configuration of the guest operating system, the management component determines whether to change the configuration by at least evaluating one or more states of the guest operating system.

10. The computer system of claim 8, wherein:
the execution environment is a virtual machine or a server; and
the management component is a virtual machine manager or a hardware device coupled to the server.

11. The computer system of claim 8, wherein the cryptographic key is a volume encryption key used to read one or more encrypted volumes or a portion of the one or more encrypted volumes attached to the execution environment.

12. The computer system of claim 8, wherein causing the cryptographic key to be made available includes at least attaching a virtual storage device that provides the cryptographic key to the execution environment.

13. The computer system of claim 8, wherein the change to the configuration is performed by a dedicated device that is part of the computer system implementing the execution environment.

14. The computer system of claim 8, wherein the executable instructions, as a result of being executed, further cause the management component to at least monitor the guest operating system to detect that a requirement for the cryptographic key has ended by at least determining that the guest operating system has at least begun the boot process.

15. The computer system of claim 8, wherein the executable instructions, as a result of being executed, further cause the management component to at least:
monitor the guest operating system to detect that the cryptographic key should be made unavailable to the guest operating system; and
reverse the change to the configuration of the execution environment that caused the cryptographic key to be made available to the guest operating system.

16. The computer system of claim 8, wherein:
the guest operating system is one of a plurality of guest operating systems running on the computer system;
the plurality of guest operating systems are launched by an automated process running on the computer system;
the management component is provided by one or more key processing service processes that are running on the computer system; and
the one or more key processing service processes at least:
provide cryptographic keys; and
monitor guest computing systems.

17. The computer system of claim 8, wherein:
the guest operating system is at least under the control of a customer of a plurality of customers of a service provider; and
the management component is under the control of the service provider.

18. The computer system of claim 17, wherein the executable instructions, as a result of being executed, cause the computer system to provide a provisioning component that at least:
receives a provisioning request at the management component from the customer to instantiate one or more guest computing instances wherein the provisioning request at least comprises:
an indication of an operating system image to base the guest operating system on, wherein:
the operating system image supports encrypted volumes via storage of the cryptographic key on a designated hardware device or via entry of the cryptographic key at startup; and
the operating system image corresponds to an operating system provided by an operating system manufacturer with a capability for supporting encrypted volumes;
an indication of one or more encrypted volumes under the control of the guest operating system; and
an indication of the cryptographic key provided by the management component; and
causes the provisioning request to be fulfilled.

19. The computer system of claim 8, wherein the executable instructions, as a result of being executed, further cause the management component to remove, from the guest computing system, access to the cryptographic key after detecting that access to the cryptographic key has ended.

20. A non-transitory computer-readable storage medium having collectively stored thereon executable instructions that, as a result of being executed by one or more processors of a computer system, cause the computer system to at least:
determine, during a boot process, that a cryptographic key, not available to a guest computing system, is required to read one or more encrypted volumes associated with the guest operating system for continued execution of the guest computing system;
enable the guest computing system to communicate with a device attached to the guest computing system having access to the cryptographic key in order to obtain the cryptographic key from the device;
monitor the guest computing system, during the boot process, to detect that the guest computing system has obtained the cryptographic key from the device; and
prevent the guest computing system from accessing the cryptographic key after the boot process completes.

21. The non-transitory computer-readable storage medium of claim 20, wherein, prior to enabling the guest computing system to communicate with the device, one or more processes on the computer system first determine whether to enable the guest computing system to communicate with the device based at least in part on one or more measurements of the guest computing system.

22. The non-transitory computer-readable storage medium of claim 20, wherein the instructions further cause the computer system to:
obtain one or more measurements of the guest computing system; and
determine, based at least in part on the obtained one or more measurements, whether the one or more measurements correspond to a state of the guest computing system for which access to the cryptographic key is authorized, wherein enabling the guest computing system to communicate with the device attached to the guest computing system having access to the cryptographic key is contingent on determining that the one or more measurements correspond to the state of the guest computing system for which access to the cryptographic key is authorized.

23. The non-transitory computer-readable storage medium of claim 20, wherein enabling the guest computing system to communicate with the device at least includes:
    creating a virtual hardware device that provides the cryptographic key; and
    attaching the virtual hardware device to the guest computing system.

24. The non-transitory computer-readable storage medium of claim 20, wherein enabling the guest computing system to communicate with the device at least includes:
    determining that the guest computing system has sent a prompt for the cryptographic key; and
    sending a response to the prompt to the guest computing system that at least includes the cryptographic key by emulating one or more keystrokes via a virtual input device.

25. The non-transitory computer-readable storage medium of claim 20, wherein enabling the guest computing system to communicate with the device at least includes:
    attaching a virtual input device to the guest computing system; and
    providing the cryptographic key to the guest computing system by creating one or more virtual inputs to the virtual input device controlled by an automated process running on the computer system.

26. The non-transitory computer-readable storage medium of claim 20, wherein monitoring the guest computing system to detect that the guest computing system has obtained the cryptographic key from the device at least includes monitoring the guest computing system to determine if the guest computing system has at least begun the boot process.

* * * * *